United States Patent [19]
Olson

[11] Patent Number: 5,088,083
[45] Date of Patent: Feb. 11, 1992

[54] DEVICE FOR CLEANING THE LASER LENS OF A COMPACT DISC PLAYER

[76] Inventor: Norman J. Olson, 934 Baileyana Rd., Hillsborough, Calif. 94010

[21] Appl. No.: 285,540

[22] Filed: Dec. 16, 1988

[51] Int. Cl.$^5$ .......................... G11B 3/58; G11B 5/02; G11B 5/10; G11B 23/20
[52] U.S. Cl. ........................................ 369/71; 369/72; 369/292; 15/246; 15/405
[58] Field of Search .................... 369/71, 291, 72, 292, 369/189, 47, 289; 350/582, 583; 15/246, 405, 250 R, 300 R

[56] References Cited

U.S. PATENT DOCUMENTS

| | | | |
|---|---|---|---|
| 4,594,617 | 6/1986 | Tezuka | 366/128 X |
| 4,817,075 | 3/1989 | Kikudin et al. | 369/41 X |
| 4,817,078 | 3/1989 | Iwata | 369/292 |

FOREIGN PATENT DOCUMENTS

| | | | |
|---|---|---|---|
| 0127540 | 7/1985 | Japan | 369/72 |
| 0127467 | 5/1988 | Japan | 369/72 |
| 63-136371 | 6/1988 | Japan | 369/72 |
| 63-273226 | 11/1988 | Japan | 369/72 |

*Primary Examiner*—Stuart S. Levy
*Assistant Examiner*—Tien Ba Pham
*Attorney, Agent, or Firm*—Owen, Wickersham & Erickson

[57] ABSTRACT

A laser lens cleaner and cleaning method for a compact-disc playing machine having a turntable-like compact-disc support, a laser-reading device with a laser lens facing the reflective playing surface of a compact disc, a motor for rotating the compact-disc support, and a control circuit for receiving instructions from a compact disc or a cleaning disc relative to rotating and stopping the compact-disc support. The cleaning disc is the same size as a compact disc for the playing machine. It has a reflective lower surface with a cleaning brush projecting out downwardly therefrom for contacting the laser lens. The cleaning disc also has digital, electrically coded data providing a portion containing instructions for the control circuit. The instructions instruct the control circuit via the laser lens what to do during rotation of the cleaning disc and to stop the cleaning disc when the laser lens has been cleaned. The instruction are inaudible to a person, but are read by and acted on by the control circuit to give the running time to clean the laser lens. The cleaning disc may have some irregular surface features for setting up air currents during rotation of the cleaning disc to clean the laser lens even when the brush does not touch the laser lens. The surface features may comprise an air vent through the cleaning disc or a brush-like member too short to touch the lens.

1 Claim, 4 Drawing Sheets

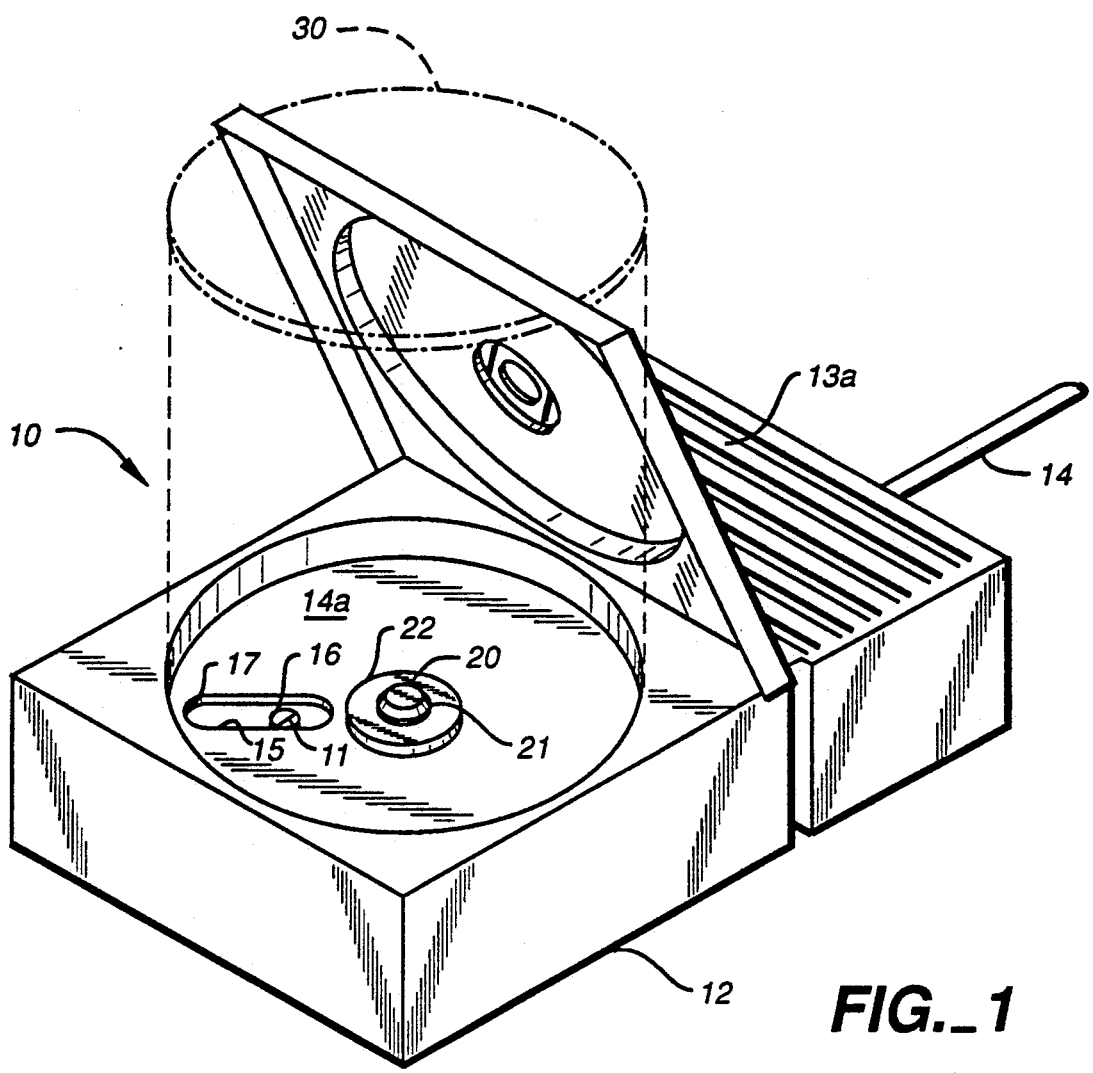
FIG._1
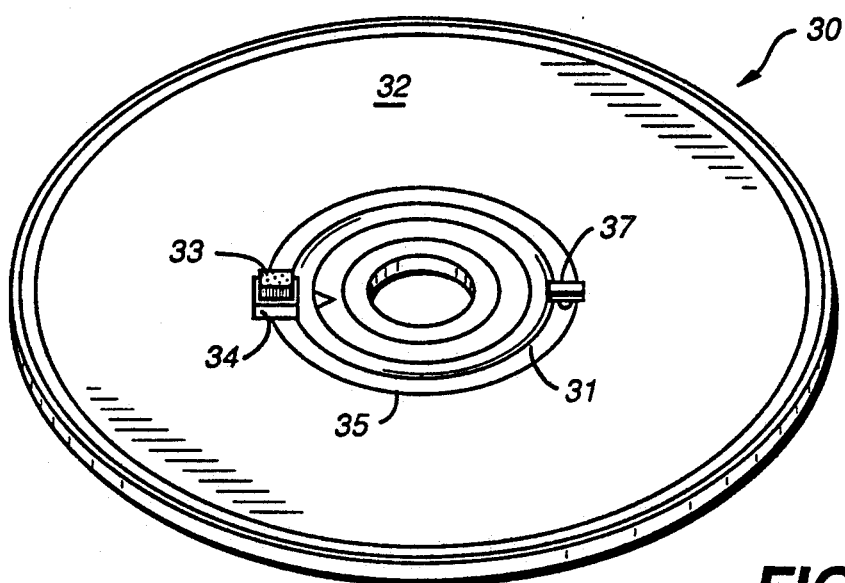
FIG._2

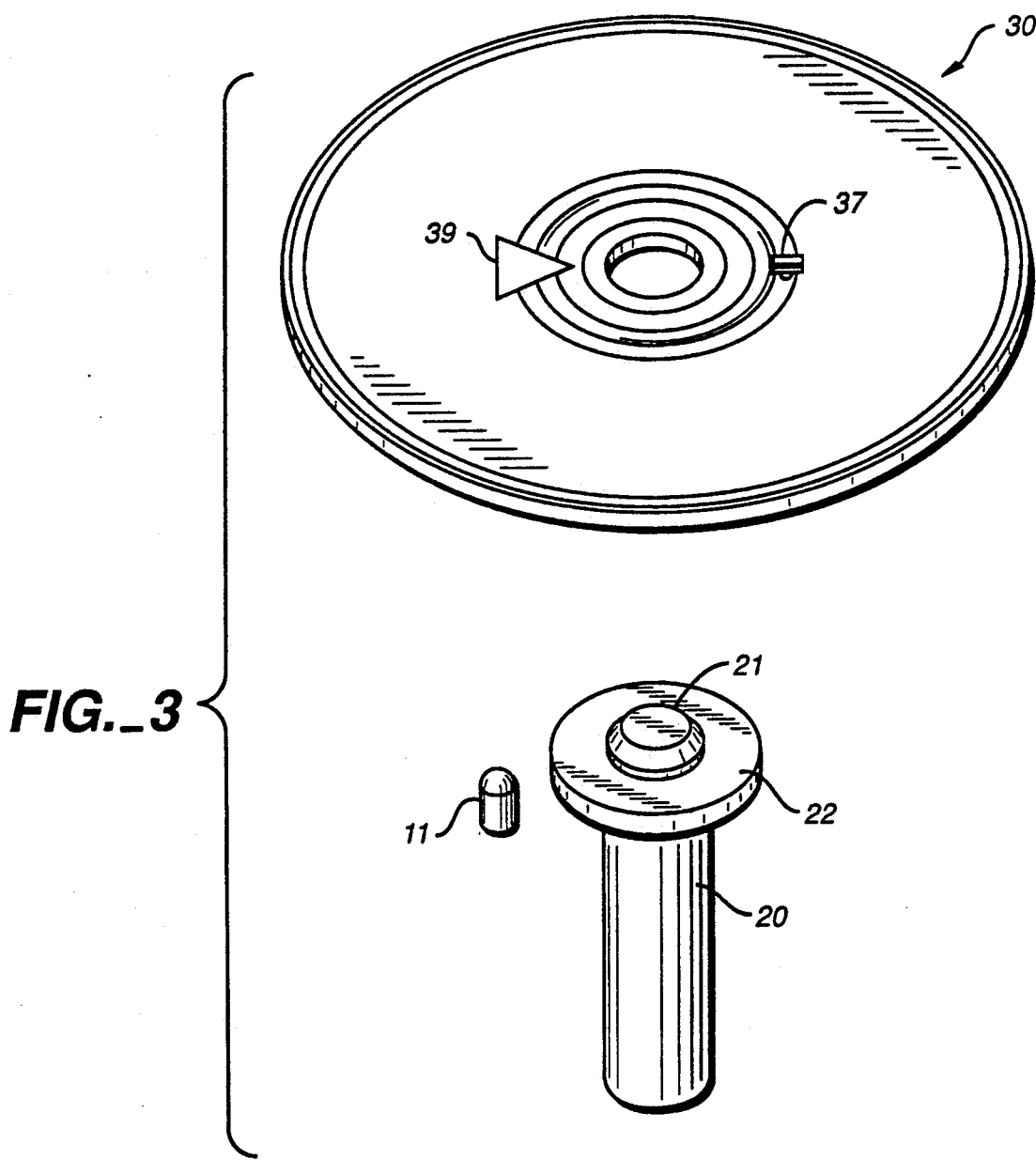
FIG._3
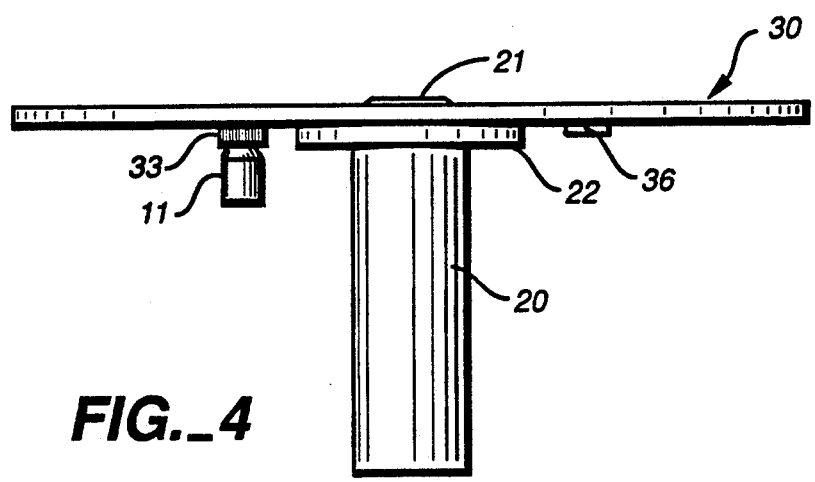
FIG._4

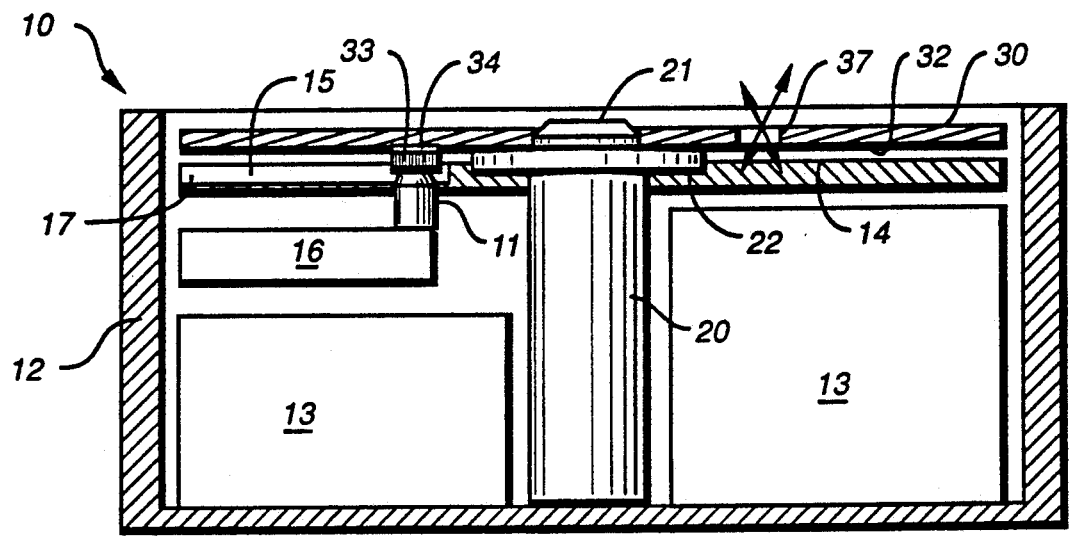
FIG._5
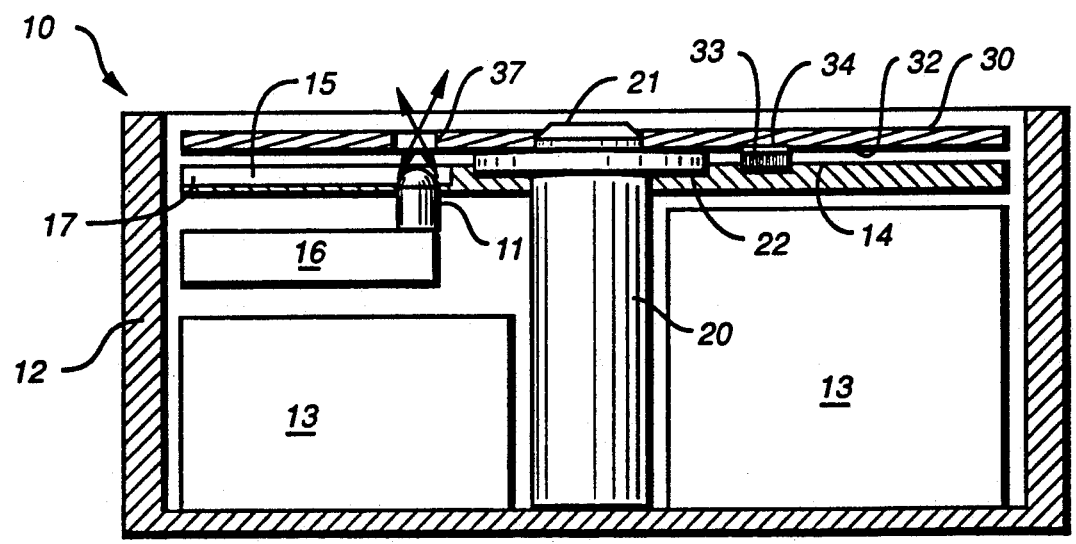
FIG._6

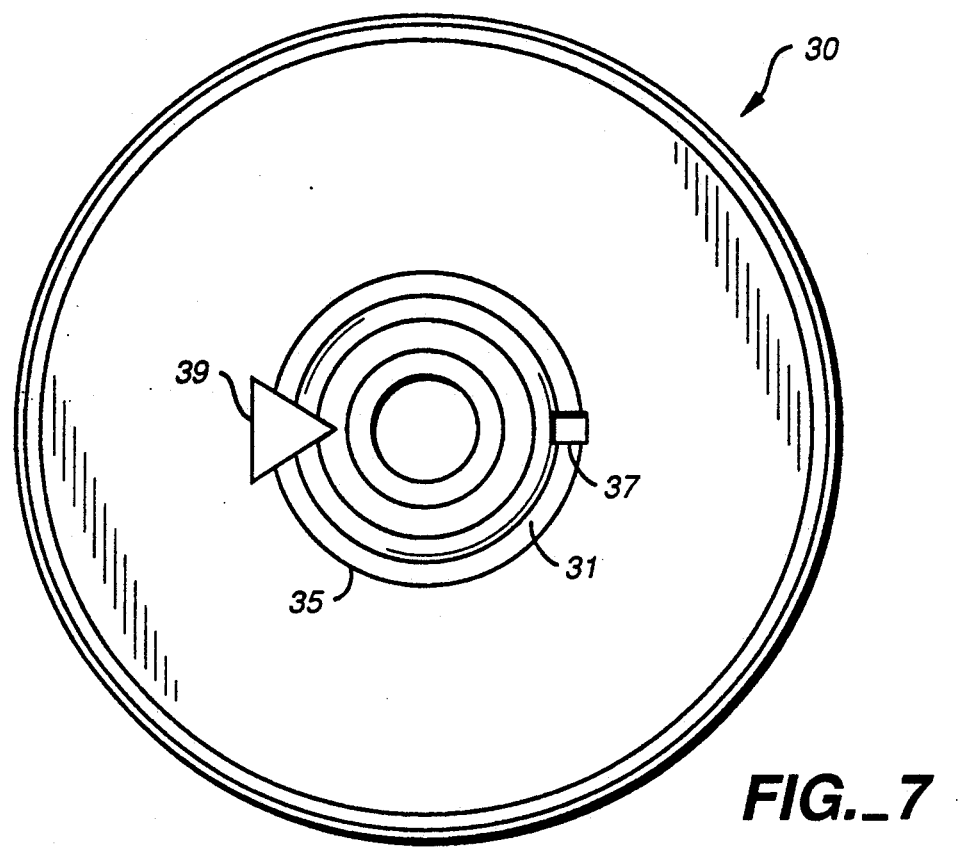
FIG._7
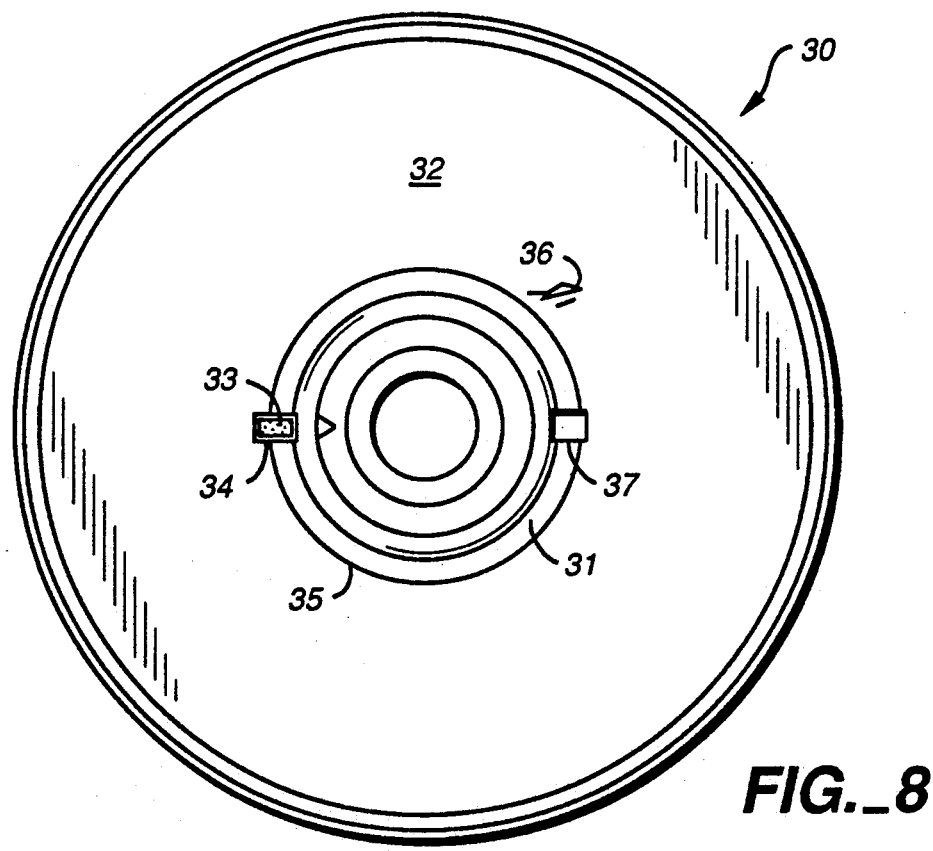
FIG._8

# DEVICE FOR CLEANING THE LASER LENS OF A COMPACT DISC PLAYER

This invention relates to a cleaning device for a compact-disc laser lens cleaner.

BACKGROUND OF THE INVENTION

A compact disc player, instead of operating by having a needle in contact with an upwardly facing groove in a rotating record, operates by a laser-reading device. A laser beam is sent up toward downwardly facing digital data on a reflective surface of a rotating disc and moves outwardly radially at a speed corresponding with the radially outward progress of the digital data, and the laser beam is reflected back down through a laser lens that sends the laser signal to a photopickup assembly and through circuitry and mechanisms to produce high-quality sound or digital data. The discs are called "compact discs" primarily because the commercial "compact discs" for music reproduction are each only approximately 12 cm in diameter instead of the nearly 30 cm diameter of a 12" LP record.

A compact-disc playing unit includes a main shaft, which is rotated by a motor and has a support flange or turntable near its upper end. On the turntable the compact disc rests. The disc rotates above a stationary flat member which has a radially extending slot thereacross. In the radial slot, a pickup assembly, including a lens, is provided and it gradually moves radially along the slot from an inner circumference toward the outer circumference, as the main shaft rotates the disc and the turntable. Since there is no needle or stylus, the instrument is relatively free from extraneous sounds.

Some compact disc players have a drawer or tray on which the compact disc is placed and which carries the disc into the player proper, where it is clamped to the turntable. Other compact-disc players require the manual placing of the disc on the turntable.

In either event, when the disc rotates on the horizontal plane, dust is apt to settle on the horizontal lens of the pickup, since the lens faces upwardly. This collection of dust distorts and may occlude the laser irradiation and affects the reproduced data. Since the laser lens rests in the radially inner part of the slot when the disc is not rotating or is removed, the lens cannot normally be cleaned from above. Therefore, ordinarily a normally stationary plate located over the slot would need to be removed in order to clean the lens.

In fact in the drawer or tray type of device, the entire slot is inside a housing that entirely denies access to the laser lens, except by disassembly of the entire player —— a thing ordinarily impossible to the user.

An object of this invention is to provide a simple cleaning apparatus for cleaning the laser lens of compact-disc players and other devices that use the C-D (compact-disc) format.

Another object of the invention is to provide a cleaning apparatus that is readily used to clean the lens of any compact disc player or other device using the C-D format.

SUMMARY OF THE INVENTION

The invention provides a cleaning disc which is preferably almost exactly the same size as a compact disc for the playing machine. In use, the cleaning disc is supported in the same way and in the same position as a compact disc on which digital data is recorded. Thus, the cleaning disc rests on the turntable, which is turned by the main shaft, resulting in rotating the cleaning disc. The downwardly facing reflective surface of the disc of this invention provides the cleaning, with a cleaning brush projecting out and down therefrom for coming into contact with the lens and wiping it clean. However, the cleaning disc of this invention may also include means such as an air vent or surface irregularities such as a short brush-like member that does not touch the lens, for providing air currents to assist in cleaning or to perform by itself to clean the laser lens during rotation of the cleaning disc, even when the brush does not touch the lens.

With any compact disc, the playing machine moves the laser lens and causes it to look for an electrically coded disc portion known as a "table of contents." With the cleaning disc of this invention there is also a "table of contents" portion which is followed by an "information" portion. The laser lens locates the "table of contents" portion and after reading that portion follows by "reading" instructions on the information portion. The "table of contents" of the cleaning disc identifies the disc as a laser lens cleaner, and the "information" portion instructs the player to spin the cleaning disc for a certain length of time, e.g., five seconds, sufficient to clean the laser lens. Both are digital, electrically coded data.

The cleaning disc therefore includes digital data on the downwardly-facing reflective surface having inaudible, readable electrically coded instructions for the playing machine's control circuitry. Rotation of the cleaning disc begins, so that the laser beam locates the table of contents and reads it and later reads the information portion which tells the control circuitry how long to continue that rotation. The rotation causes the lens to be cleaned.

BRIEF DESCRIPTION OF THE DRAWINGS

FIG. 1 is a view in perspective of a portable playing machine for compact discs with a protective cover swung open. In broken lines above the player is shown the outline in dotted lines of a cleaning disc of this invention.

FIG. 2 is a view in perspective from below of a cleaning disc embodying the principles of the present invention.

FIG. 3 is an exploded view in perspective of the cleaning device of FIG. 2 and a portion of the player, as seen from above.

FIG. 4 is a view in end elevation of the combination of FIG. 2.

FIG. 5 is a view in vertical section of a playing machine like that of FIG. 1 with the cleaning disc in place.

FIG. 6 is a similar view showing a modified form of cleaning disc embodying the principles of the invention.

FIG. 7 is a top plan view of one form of the cleaning disc of the invention.

FIG. 8 is a similar view of another form of the cleaning disc of the invention.

SOME PREFERRED EMBODIMENTS OF THE INVENTION

A compact-disc playing machine or player 10, though not a part of the cleaning apparatus itself, is used to actuate the cleaner. It contains an upwardly facing horizontal laser lens 11 which is to be cleaned. The structure of a drawer-type player is different, but is sufficiently similar so that the invention is illustrated and described herein. The player 10 illustrated is a portable machine, and it comprises a housing 12, in the lower part of which may be a control device 13. At one side of the housing 12 may be placed a power supply 13a. The control device 13 may lead by a cord 14 to external speakers (not shown) or other device (not shown). A stationary flat surface 14a approximately the size of a compact disc is provided. A radial slot 15 is provided in which is mounted apparatus 16 that carries the laser lens 11. When a compact disc is being played, the laser lens 11 moves along the radial slot 15 from the inner periphery of the disc to an outer circumferences 17.

A main shaft 20, located at the center, is provided at its upper end 21 with a small horizontal flange 22, which is called the turntable. The playing disc is set on this turntable 22, its inner periphery surrounding the shaft 20, and its reflective lower surface is scanned by the laser lens 11 to enable a laser signal reflected from the lower surface of the compact disc to pass through the lens 11 and go to the control apparatus 13 in the housing 12. There, it is decoded. When the lens 11 gets dirty and the compact disc is removed, a cleaning disc 30 may be mounted on the turntable 22.

The cleaning disc 30 looks like the compact disc that is normally played, except for notations on it to identify it. It includes on its lower reflective surface 32 digital data including a table of contents portion 31 and an information portion 35 which contains instructions that are inaudible to a person or listener but are electrically coded and are used in conjunction with the control system 13 for the compact disc 10 to enable the shaft 20, when it starts rotating to learn how long it is to rotate and to stop rotation after a predetermined time.

Thus, the lower surface 32 of the disc 30 includes a brush 33, which also has a square mount 34 secured to the bottom surface 32 of the disc 30. The brush 33 thus may preferably project down a sufficient distance so that at every rotation of the disc 30, during a predetermined time, it wipes the laser lens 11 and thereby acts to clean dust from it. There need not be many rotations in order to clean the lens 11, and the control circuitry 13 of the system is informed from the information portion 35 of the disc 30 what to do. When the lens 11 is clean (or when the disc 30 has made a certain number of rotations), the machine 10 is stopped, and the cleaning disc 30 may then be removed from it.

In addition, the bottom surface 32 of the disc 30 may include some surface irregularities 36 which serve to provide air currents that act to blow dust particles and other foreign matter off the lens 11 and thereby help in the cleaning. In fact, it may accomplish cleaning even when the brush 33 itself does not touch the laser lens 11. So the surface irregularity may comprise a brush 33 that is too short to touch the lens 11.

In addition, as shown in FIG. 5, the cleaning disc 30 may have a through opening or air vent 37 for producing such cleaning air currents.

Thus, the cleaning disc 30 is put onto the turntable 22, with the surface 32 down and with a red arrow 39 on the opposite side of the disc 30 indicating the proper installation position, and the machine 10 is started to rotate the disc 30. The digital instructions from the portions 31 and 35 go to the control circuitry 13 in the housing 12, and the shaft 20 is thereby controlled for stopping the disc 30. Either the brush 33 or the air currents clean the lens 11 as the disc 30 rotates, thereby providing the necessary cleaning action.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A laser lens cleaner for a compact-disc playing machine having a turntable-like compact-disc support for a compact disc, a laser-reading device with a laser lens facing the reflective, playing lower surface of a compact disc, motor means for rotating said compact-disc support and control means for receiving electrically coded instructions from a compact disc or a cleaning disc relative to playing and stopping said compact-disc support for cleaning said laser lens, comprising:

a cleaning disc substantially the same size as a compact disc for said playing machine, said cleaning disc being adapted to be supported on said turntable-like compact-disc support, said cleaning disc having a reflective lower surface with a cleaning brush projecting out downwardly therefrom, a set of irregular surface features on said lower cleaning surface of said cleaning disc for setting up air currents during rotation of said cleaning disc to assist in cleaning said laser lens even when said brush does not touch said laser lens, said surface features including a member depending from said lower surface for a distance that is too short to touch said lens, said cleaning disc also having digital data thereon with a portion containing instructions for said control means, said instructions instructing said control means via said laser lens to act during rotation of said compact-disc support, said cleaning disc being in place, to initiate cleaning of said laser lens, and for stopping said compact-disc support and said cleaning disc after said laser lens has been cleaned, said instructions being inaudible to a person, but detected by and acted on by said control means, to give the running time required to clean said lens, and to stop said disc after said lens has been cleaned.

* * * * *